(12) United States Patent
Malcherek

(10) Patent No.: US 11,829,017 B2
(45) Date of Patent: Nov. 28, 2023

(54) COMPONENT HAVING AN INTEGRATED DISPLAY DEVICE

(71) Applicant: Annax GmbH, Brunnthal (DE)

(72) Inventor: Werner Malcherek, Dachau (DE)

(73) Assignee: Annax GmbH, Brunnthal (DE)

( * ) Notice: Subject to any disclaimer, the term of this patent is extended or adjusted under 35 U.S.C. 154(b) by 700 days.

(21) Appl. No.: 16/894,763

(22) Filed: Jun. 6, 2020

(65) Prior Publication Data

US 2021/0383733 A1 Dec. 9, 2021

Related U.S. Application Data

(63) Continuation of application No. PCT/DE2018/100948, filed on Nov. 21, 2018.

(51) Int. Cl.
*G09F 13/04* (2006.01)
*G02F 1/1333* (2006.01)
*G09F 9/33* (2006.01)
*G09F 13/00* (2006.01)

(52) U.S. Cl.
CPC .......... *G02F 1/133308* (2013.01); *G09F 9/33* (2013.01); *G09F 13/0413* (2013.01); *G09F 13/005* (2013.01)

(58) Field of Classification Search
CPC ......... G09G 2300/04–0495; G06F 1/16–1698; G06F 1/1633; G06F 1/1637; G06F 1/1658
See application file for complete search history.

(56) References Cited

U.S. PATENT DOCUMENTS 9,343,002 B2 * 5/2016 Hagemann .............. G09F 9/335
2017/0349090 A1 * 12/2017 Dellock ..................... B60J 1/00

FOREIGN PATENT DOCUMENTS

WO WO-2014019281 A1 * 2/2014 ............. F25D 23/02

* cited by examiner

*Primary Examiner* — Cassandra Davis
(74) *Attorney, Agent, or Firm* — THE SMALL PATENT LAW GROUP LLC; Mary D. Lawlor

(57) ABSTRACT

A planar component and a method of manufacturing thereon includes an integrated display device for digital information display, comprising a glass pane, at least one screen module, and a controller for controlling and supplying energy to the screen module. A front surface of the screen module forms at least a part of a front side of the component, and the remaining part of the front side of the component is formed by the glass pane.

20 Claims, 3 Drawing Sheets

COMPONENT HAVING AN INTEGRATED DISPLAY DEVICE

CROSS-REFERENCE TO RELATED APPLICATIONS

This application is a continuation of and claims priority to PCT Application No. PCT/DE2018/100948, filed Nov. 21, 2018, which claims priority to DE Application No. DE 102017129308, filed Dec. 8, 2017. The entire disclosures of which are incorporated herein by reference.

BACKGROUND

Technical Field

The subject matter described relates a planar component having an integrated display device for digital information display, comprising a glass pane, at least one screen module, and a controller for controlling and supplying energy to the screen module.

Discussion of Art

Known thin film transistor (TFT) screen modules may be manufactured with glass or aluminum elements, which enable a space-saving construction with an aesthetically appealing design. The use of glass elements is preferred where a floating installation of the display device is intended, e.g., an integration in window areas, since transparent glass elements do not significantly impair the field of vision. Due to their transparency, glass elements are used to frame TFT modules wherever the information displayed is to be visible from both sides.

In the prior art, display systems are known which are attached in a manner integrated and disposed between two glass panes. For example, the published patent applications EP 3,015,915 A1 and WO 2015/067244 A1 propose to install a display between two glass panes arranged parallel and at a distance from one another. This display can only be readable from one side, however, displays readable on both sides are preferred. In WO 2013/028466 A2 an encapsulated design is used in which a screen module of the display device, optionally together with backlighting and transmission filter, is firmly laminated into two opaquely arranged recesses of two glass panes that function as the front and back sides of the entire component.

These designs have the disadvantage of inadequate access to the screen module in the event of necessary maintenance or replacement measures. In the case of a component, the surface of which is only partially taken up by the display device, the use of a continuous front cover made of glass also leads to an undesired increase in the component thickness and also requires some effort in the production of the component.

BRIEF DESCRIPTION OF THE DRAWINGS

The inventive subject matter may be understood from reading the following description of non-limiting embodiments, with reference to the attached drawings, intended to illustrate the present subject matter and in no way limit it, wherein.

DETAILED DESCRIPTION

Figure 1:
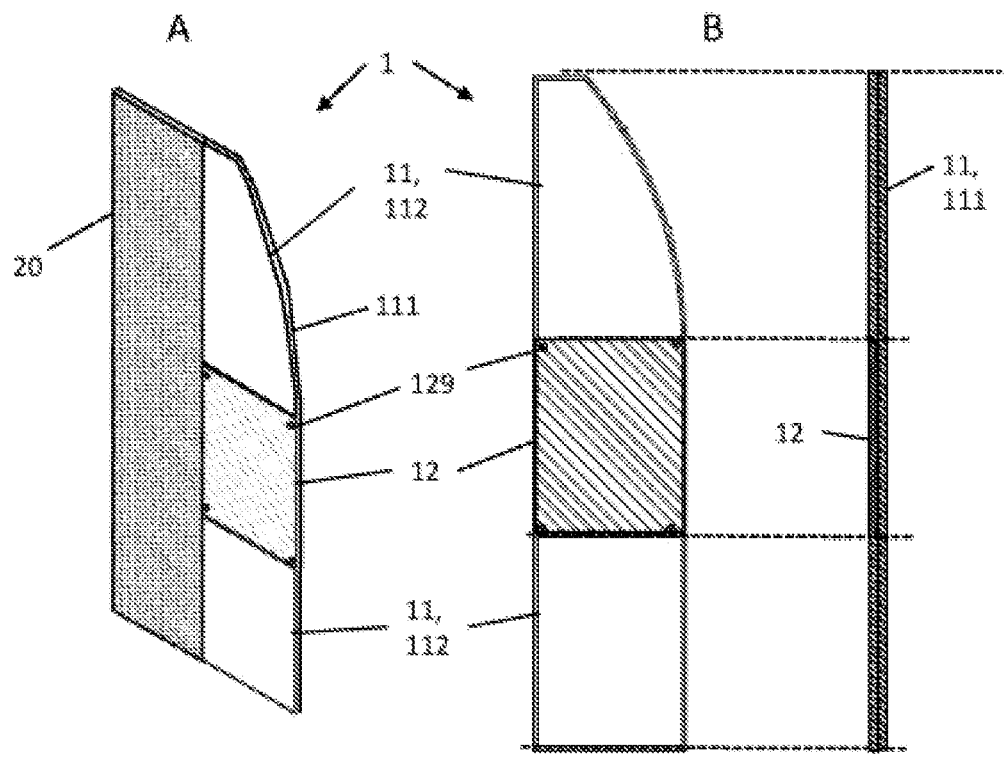
FIG. 1 shows in two partial figures a perspective view and a front view of an embodiment of the component according to one or more embodiments.

Embodiments of the subject matter described herein relate to planar, glass components having an integrated display device assemblies. The integrated display assemblies may provide reduced thickness and improved accessibility relative to known TFT screen modules, or may require less effort to produce, without having to accept aesthetic losses in comparison with the known embodiments.

The front side of the display device represents the front side of the component, or at least a section thereof. A continuous glass pane is used for the back side of the component to allow free accessibility of the display device from the front and enables a reduced thickness of the component, and a reduction of material costs. Additionally, an anti-reflective coating and/or anti-fingerprint coating may only be needed for the front surface of the screen module.

In one or more embodiments, a front cover may can be dispensed with a transparent cover to protect the display device against external environmental influences such as dust, dirt, impacts and the like. The transparent cover may be integrated in the display device and form the front side, e.g., in the form of a glass or acrylic glass pane.

In another embodiment of the component, the rear glass pane has an opening or depression the dimensions of which are adapted to the dimensions of the display device in such a way that the latter is received flush therein and forms a planar front side with the surrounding sections of the glass pane. As a result, the display device is encased in a protective manner and a visually appealing, continuous front section is created.

In addition to being used in vehicles such as rail vehicles, automobiles, trucks, buses, mining vehicles, marine vessels, aircraft, agricultural vehicles, or other off-highway vehicles, the component may be used in buildings or other stationary systems. Known display devices with an image embedded between two panes of glass may prohibit for the display to change, for example, from an interior design open through glass walls to the display of information such as maps, directions, timetables. Traditionally, a display device had to be set up separately for this purpose, which leads to conflicts with the desired open design. The embodiments described herein enable transparent glass wall panels or glass doors to simultaneously serve to present useful information, entertaining information, advertising, or the like.

In one or more embodiments, the display device may include additional bordering or component may include a frame, for example made of metal. For example, a frame can provide further protection and stability, can be beneficial in terms of the integration of the component into the application environment in such a way that hinges or fittings may be provided thereon, as well as serve the design configuration.

For the purpose of maintenance or replacement, the display device can be releasably connected to the rear glass pane. For this purpose, different connection options can be used and combined. In the case of a suitable opening or receptacle in the glass pane, a form-locking or force-locking, optionally supported by clamping wedges or pins, is possible. Furthermore, screws can be utilized, which screws are screwed into the frame or in threaded sleeves, for example, which are glued into the rear glass pane, or countered behind through holes.

The display device can be based on a TFT module, which comprises an LCD or oLED screen, the front side of which should be protected by a glass pane. The TFT module is controlled via a controller, which is advantageously arranged in a space-saving manner outside the component and communicates with the module via a cable or WiFi connection. In particular, a module frame can serve as the module-side WiFi antenna. Backlighting of the TFT module can be integrated to improve the brightness and contrast of the display.

In one or more embodiments, information may be visibly displayed on both sides by using transparent backlighting or a transparent substrate of the oLED screen. With the additional use of an optical filter, which has a controllable degree of transmission, one side of the display device can optionally also be switched idle. Furthermore, such a filter can be used to adjust the brightness and contrast of the display in detail.

It is also conceivable to use two TFT modules one behind the other, with a backlighting source being arranged between them. As a result, different information can be displayed on both sides of the component according to the invention.

In one or more embodiments, the display device can be equipped with a motion detector or heat sensor, which may activate the screen display when a person approaches or gestures. Such an activation only when required enables energy savings and the view through the transparent component only deteriorates when necessary. For example, the attention of a person may be intuitively drawn to the advertising that suddenly appears in their field of vision.

The embodiments described above can be combined with one another in a suitable form.

FIG. 1 shows an embodiment of the planar component according to one or more embodiments for use as a partition, for example in a passenger transport vehicle of a rail vehicle, an automobile, a truck, a marine vessel, mining equipment, an aircraft, an agricultural vehicle, an off-highway vehicle, or a bus. A perspective view is shown in partial figure A and a top view or a side view is shown in partial figure B.

Component 1 has a fundamentally three-part construction with a width that tapers upwards consisting of an upper and lower glass element 112, which, as can be seen in the side view of partial figure B, form the glass pane 11 by being laminated onto a large, continuous, rear glass element 111. A rectangular recess remains between the two glass elements 112, into which the screen module 12 is inserted and releasably attached by means of the screws 129. The fact that screen module 12 forms part of the front side of component 1, without a front cover for example in the form of another glass pane being present, achieves an advantageously low thickness of the component, on the one hand, and furthermore readily ensures the accessibility of the screen module for maintenance or replacement purposes. This is all the more important since the front window and, in the case of readability on both sides, the back side also, are usually anti-reflective and provided with The front side of the screen module may include an anti-fingerprint coating for better readability in the presence of many light sources and to reduce an amount of soiling of the glass, such as by fingerprints. In the present embodiment, only the part of the front surface of the component that requires these measures is prepared with the anti-fingerprint coating, namely the screen module. The glass elements 112, however, do not need such coatings.

The component 1 is attached in a continuation of a non-transparent wall 20. The controller (not shown here) for controlling and supplying energy to the screen module 12 can advantageously be accommodated within the wall 20.

Figure 2:
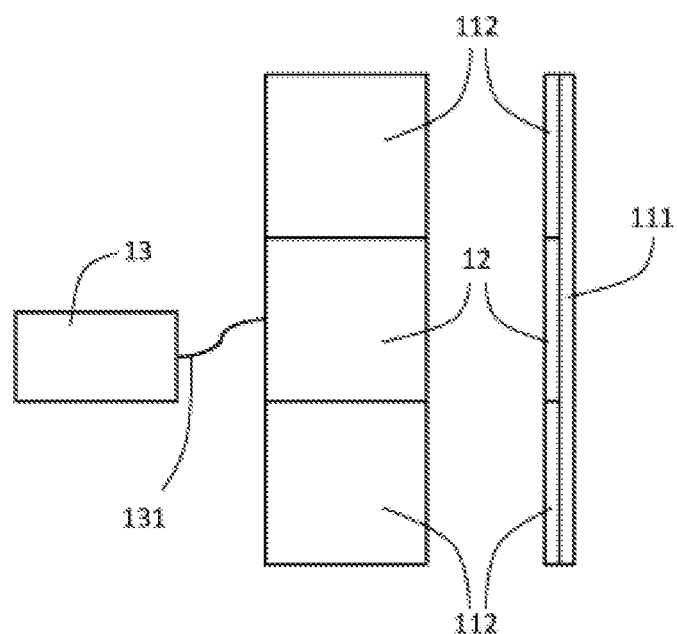
FIG. 2 shows a front view and side view of a rectangular embodiment of a component according to one or more embodiments with a glass pane consisting of several glass elements.

FIG. 2 shows a schematic top and side view of an embodiment which is similar to that from FIG. 1, with the difference that all glass elements and thus the component as a whole are rectangular. Furthermore, the controller 13 provided for control and energy supply is shown, which is connected to the screen module 12 via a connecting cable 131. Said cable may include lines for the energy supply of the components of the screen module, such as a TFT module with backlighting or an oLED screen module, hand lines for the control signals of the screen module, which comprises a digital or analog image signal for controlling a TFT matrix, control signals for backlighting, and/or an optical filter that can be controlled in terms of its transparency.

Figure 3:
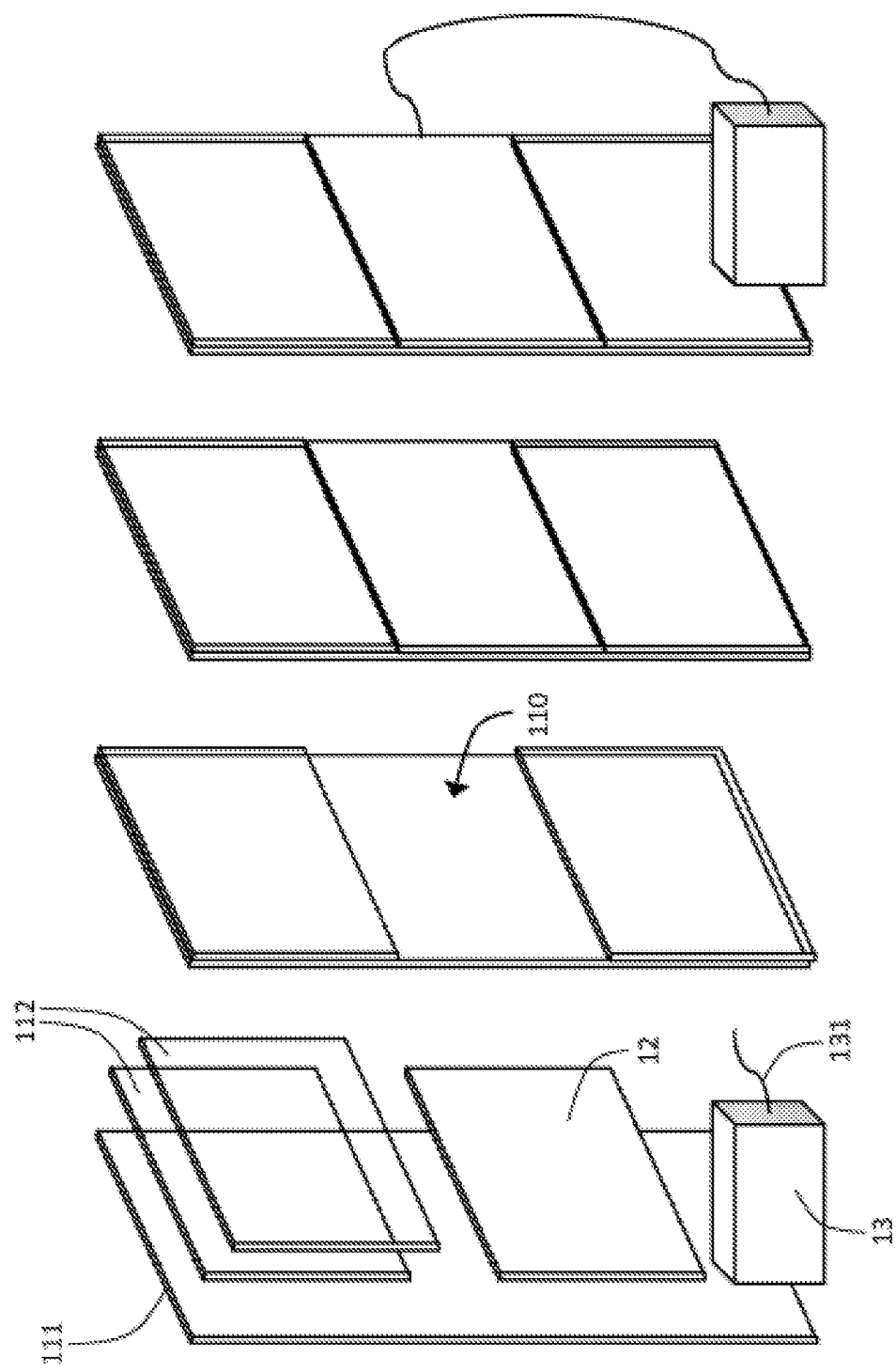
FIG. 3 shows production steps for the embodiment shown in FIG. 2.

FIG. 3 illustrates the production method of the planar component according to the embodiment illustrated in FIG. 2. The first partial figure shows all components used. These components include the large glass element 111, two smaller, also rectangular glass elements 112, the screen module 12 and the controller 13 with a connecting cable 131.

The second partial figure shows the first step of the production method, in which the two small glass elements are laminated flush at the top and bottom ends of the glass element 111. A rectangular recess or depression 110 of the exact size of the screen module 12 remains between the glass elements 112.

In the third step, the screen module 12 is inserted into this depression 110 and releasably attached there.

The fourth and last step involves connecting the controller 13 to the screen module 12 by connecting the contacts of the connecting cable 131 to the corresponding connections on the screen module 12. In one or more embodiments, at least a part of an end face of the screen module may be accessible from the outside, i.e., the depression 110 is not completely surrounded circumferentially by the glass elements 112. For example, FIG. 3 illustrates two opposite end faces of the screen module freely accessible. Optionally, part of an end face may provide sufficient space for accommodating the connections of the screen module.

It is to be understood that the use of differently dimensioned or shaped glass elements also makes it possible to realize other geometries both for the layout of the component 1 and the recess 110 and the screen module 110, respectively, without thereby departing from the basic idea of the present embodiments.

Figure 4:
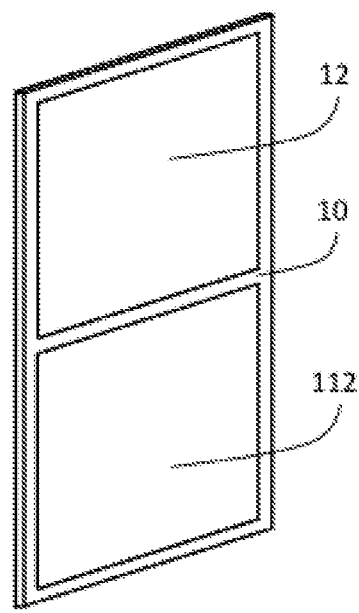
FIG. 4 shows a perspective view of a further embodiment of a component according one or more embodiments in which a glass pane and screen module are arranged in a frame.

FIG. 4 shows another embodiment of the component that includes a frame to improve a stability of the component. For this purpose, frame 10 has openings, in the present case two, into which both a screen module 12 and a glass element 112 are inserted. In one or more embodiments, the glass element may be permanently connected to the frame, for example by gluing or casting, but alternatively may be removably attached. Alternatively, the screen module may be releasably attached, in particular screwed or clamped, in order to facilitate a subsequent replacement.

Due to the frame 10, this embodiment may be used as a door or wall element in buildings.

Figure 5:
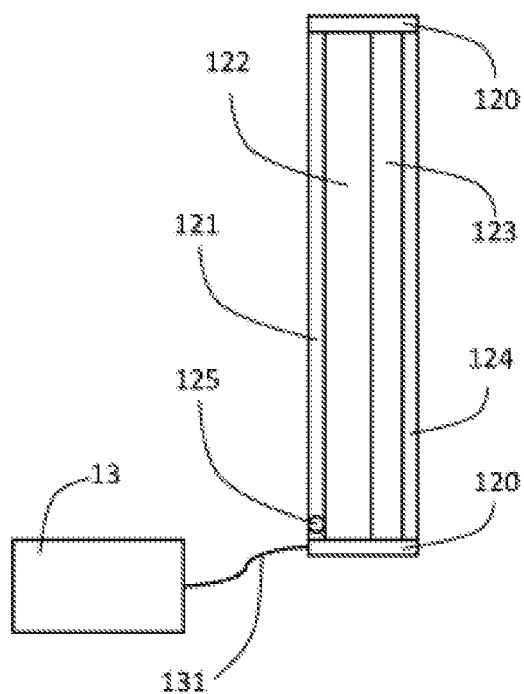
FIG. 5 shows schematically the structure of a variant of the screen module of a component according to the one or more embodiments.

FIG. 5 shows a layer structure of an embodiment of the screen module and the positioning of the connections in accordance with one embodiment.

The foremost layer is formed by front glass pane 121. Behind it is a TFT module 122 in the form of an array of pixels of an LCD matrix controlled by thin-film transistors. To improve the brightness and contrast in bright ambient light and to display information in the dark, there is a planar backlighting 123 behind the TFT module 122. The connection, as the fourth and lowest/rearmost layer, is formed by an optical filter 124, the transparency of which can be controlled. This is usually done by applying a more or less high DC voltage, which can be provided by controller 13.

These layers are held together by a mounting frame 120, which may be made of metal, such as, for example, aluminum, aluminum-lithium or magnesium, as a result of which it can simultaneously serve as a WiFi antenna. The mounting frame 120 also houses the connections for the connecting cable 131 of controller 13.

In one or more embodiments of the subject matter described herein, a integrated display assembly may include a transparent substrate having a first side and a second side, and a screen module including a front side and a rear side. The rear side of the screen module is operably coupled with the first side of the transparent substrate. The screen module includes a display and one or more processors configured to control operation of the display. A controller may be operably coupled with the one or more processors of the screen module to control one or more settings of the screen module. The integrated display assembly may include one or more transparent elements, each having a front side and an opposite rear side. The rear side of each transparent element is operably coupled with the first side of the transparent substrate. The front side of the screen module and the front side of each of the transparent elements may form a continuous planar surface such that the front side of the screen module is flush with the front side of each of the transparent elements.

Optionally, the front side of the screen module may form at least a part of the first side of the transparent substrate.

Optionally, the controller may wirelessly control the one or more settings of the screen module.

Optionally, the first and second sides of the transparent substrate, the front and rear sides of the screen module, and the front and rear sides of the one or more transparent elements may be planar.

Optionally, the one or more transparent elements may extend a distance away from the first side of the transparent substrate, and the screen module may extend the same distance away from the first side of the transparent substrate.

Optionally, a first transparent element of the one or more transparent elements may be disposed at a first location along the first side of the transparent substrate, and a second transparent element of the one or more transparent elements may be disposed at a second location along the first side of the transparent substrate to form a recess between the first and second transparent elements.

Optionally, the screen module may be disposed within the recess formed by the first and second transparent elements.

Optionally, the screen module may have a shape that is substantially the same as a shape of the recess.

Optionally, the display may display one or more first images toward the front side of the screen module, and display one or more second images toward the rear side of the screen module.

Optionally, the controller may be operably coupled with the one or more processors of the screen module via one or more wires. The one or more wires may be integrated with and extend within one or more of the transparent substrate, the one or more transparent elements, or the screen module.

In one or more embodiments of the subject matter described herein, a planar integrated display assembly may include a transparent substrate having a first side and a second side and a recess. The recess may be an opening of a portion of the first side of the transparent substrate. The display assembly may include a screen module having a front side and a rear side. The screen module is disposed within the recess and the rear side of the screen module is operably coupled with the first side of the transparent substrate. The screen module may include a display and one or more processors to control operation of the display. The display assembly may include a controller operably coupled with the one or more processors of the screen module. The controller may control one or more settings of the screen module.

Optionally, the front side of the screen module may form at least a part of the first side of the transparent substrate.

Optionally, the display may display one or more first images toward the front side of the screen module and may display one or more second images toward the rear side of the screen module.

Optionally, the front side of the screen module and the first side of the transparent substrate are configured to form a continuous planar surface.

Optionally, the controller may wirelessly control the one or more settings of the screen module.

Optionally, the first and second sides of the transparent substrate and the front and rear sides of the screen module may be planar.

Optionally, the screen module may be removably coupled with the transparent substrate within the recess.

Optionally, the screen module may have a shape that is substantially the same as a shape of the recess.

Optionally, the display assembly may include one or more transparent elements. Each of the transparent elements may have a front side and an opposite rear side. The rear side of each of the transparent elements may be operably coupled with the first side of the transparent substrate and positioned to form the recess.

In one or more embodiments of the subject matter described herein, a planar component having an integrated display device for displaying digital information may include a transparent pane having a first side and a second side, a screen module, one or more transparent elements, and a controller. The screen module may have a front side and a rear side. The rear side of the screen module may be operably coupled with the first side of the transparent pane. The screen module may include a display and one or more processors configured to control operation of the display. Each of the one or more transparent elements may have a front side and an opposite rear side. The rear side of each of the transparent elements may be operably coupled with the first side of the transparent pane. The controller may be operably coupled with the one or more processors of the screen module and may control one or more settings of the screen module. A first transparent element of the one or more transparent elements may be disposed at a first location along the first side of the transparent substrate, and a second transparent element of the one or more transparent elements may be disposed at a second location along the first side of the transparent substrate to form a recess between the first and second transparent elements. The screen module may be disposed within the recess between the first and second transparent elements such that the one or more transparent elements form a frame along one or more sides of the screen module. The front side of the screen module and the front side of each of the transparent elements may form a continuous planar surface such that the front side of the screen module is flush with the front side of each of the transparent elements. The front side of the scree module and the front side of each of the transparent elements may form a continuous exterior surface of the planar component.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. An integrated display assembly comprising:
   a transparent substrate having a first side and a second side;
   a screen module comprising a front side and a rear side, wherein the rear side of the screen module is configured to be operably coupled with the first side of the transparent substrate, the screen module comprising a display and one or more processors configured to control operation of the display;
   a controller operably coupled with the one or more processors of the screen module to control one or more settings of the screen module; and
   one or more transparent elements, each of the one or more transparent elements having a front side and an opposite rear side, wherein the rear side of each of the one or more transparent elements is configured to be operably coupled with the first side of the transparent substrate,
   wherein the front side of the screen module and the front side of each of the one or more transparent elements are configured to form a continuous planar surface such that the front side of the screen module is flush with the front side of each of the one or more transparent elements.

2. The integrated display assembly of claim 1, wherein the front side of the screen module is configured to form at least a part of the first side of the transparent substrate.

3. The integrated display assembly of claim 1, wherein the controller is configured to wirelessly control the one or more settings of the screen module.

4. The integrated display assembly of claim 1, wherein the first and second sides of the transparent substrate, the front and rear sides of the screen module, and the front and rear sides of the one or more transparent elements are planar.

5. The integrated display assembly of claim 1, wherein the one or more transparent elements extend a distance away from the first side of the transparent substrate, and the screen module extends the same distance away from the first side of the transparent substrate.

6. The integrated display assembly of claim 1, wherein a first transparent element of the one or more transparent elements is disposed at a first location along the first side of the transparent substrate, and a second transparent element of the one or more transparent elements is disposed at a second location along the first side of the transparent substrate to form a recess between the first and second transparent elements.

7. The integrated display assembly of claim 6, wherein the screen module is configured to be disposed within the recess formed by the first and second transparent elements.

8. The integrated display assembly of claim 6, wherein the screen module has a shape that is substantially the same as a shape of the recess.

9. The integrated display assembly of claim 1, wherein the display is configured to display one or more first images toward the front side of the screen module and display one or more second images toward the rear side of the screen module.

10. The integrated display assembly of claim 1, wherein the controller is operably coupled with the one or more processors of the screen module via one or more wires, wherein the one or more wires are integrated with and extend within one or more of the transparent substrate, the one or more transparent elements, or the screen module.

11. A planar integrated display assembly comprising:
a transparent substrate having a first side and a second side and a recess, wherein the recess is an opening of a portion of the first side of the transparent substrate;
a screen module comprising a front side and a rear side, wherein the screen module is configured to be disposed within the recess and the rear side of the screen module is configured to be operably coupled with the first side of the transparent substrate, the screen module comprising a display and one or more processors configured to control operation of the display; and
a controller operably coupled with the one or more processors of the screen module, wherein the controller is configured to control one or more settings of the screen module.

12. The planar integrated display assembly of claim 11, wherein the front side of the screen module is configured to form at least a part of the first side of the transparent substrate.

13. The planar integrated display assembly of claim 11, wherein the display is configured to display one or more first images toward the front side of the screen module and display one or more second images toward the rear side of the screen module.

14. The planar integrated display assembly of claim 11, wherein the front side of the screen module and the first side of the transparent substrate are configured to form a continuous planar surface.

15. The planar integrated display assembly of claim 11, wherein the controller is configured to wirelessly control the one or more settings of the screen module.

16. The planar integrated display assembly of claim 11, wherein the first and second sides of the transparent substrate and the front and rear sides of the screen module are planar.

17. The planar integrated display assembly of claim 11, wherein the screen module is configured to be removably coupled with the transparent substrate within the recess.

18. The planar integrated display assembly of claim 11, wherein the screen module has a shape that is substantially the same as a shape of the recess.

19. The planar integrated display assembly of claim 11, further comprising one or more transparent elements, each of the one or more transparent elements having a front side and an opposite rear side, wherein the rear side of each of the one or more transparent elements is configured to be operably coupled with the first side of the transparent substrate and positioned to form the recess.

20. A planar component comprising an integrated display device for displaying digital information comprising:
a transparent pane having a first side and a second side;
a screen module comprising a front side and a rear side, wherein the rear side of the screen module is configured to be operably coupled with the first side of the transparent pane, the screen module comprising a display and one or more processors configured to control operation of the display;
one or more transparent elements, each of the one or more transparent elements having a front side and an opposite rear side, wherein the rear side of each of the one or more transparent elements is configured to be operably coupled with the first side of the transparent pane; and
a controller operably coupled with the one or more processors of the screen module, wherein the controller is configured to control one or more settings of the screen module,
wherein a first transparent element of the one or more transparent elements is disposed at a first location along the first side of the transparent pane, and a second transparent element of the one or more transparent elements is disposed at a second location along the first side of the transparent substrate to form a recess between the first and second transparent elements,
wherein the screen module is configured to be disposed within the recess between the first and second transparent elements such that the one or more transparent elements are configured to form a frame along one or more sides of the screen module,
wherein the front side of the screen module and the front side of each of the one or more transparent elements are configured to form a continuous planar surface such that the front side of the screen module is flush with the front side of each of the one or more transparent elements, and
wherein the front side of the screen module and the front side of each of the one or more transparent elements are configured to form a continuous exterior surface of the planar component.

* * * * *